United States Patent
Rathonyi et al.

(10) Patent No.: US 8,612,242 B2
(45) Date of Patent: Dec. 17, 2013

(54) MINIMIZING SPEECH DELAY IN COMMUNICATION DEVICES

(75) Inventors: Béla Rathonyi, Lomma (SE); Jan Fex, Lund (SE)

(73) Assignee: ST-Ericsson SA, Plan-les-Ouates (CH)

( * ) Notice: Subject to any disclaimer, the term of this patent is extended or adjusted under 35 U.S.C. 154(b) by 368 days.

(21) Appl. No.: 12/858,670

(22) Filed: Aug. 18, 2010

(65) Prior Publication Data
US 2011/0257983 A1  Oct. 20, 2011

Related U.S. Application Data

(60) Provisional application No. 61/324,956, filed on Apr. 16, 2010.

(51) Int. Cl.
G10L 21/04 (2006.01)

(52) U.S. Cl.
USPC ............................ 704/503; 704/200; 704/201

(58) Field of Classification Search
USPC .......................... 704/200–201, 228, 500–504
See application file for complete search history.

(56) References Cited

U.S. PATENT DOCUMENTS

| | | | | |
|---|---|---|---|---|
| 6,785,261 B1 * | 8/2004 | Schuster et al. | ............ | 370/352 |
| 6,985,856 B2 * | 1/2006 | Wang et al. | ............ | 704/226 |
| 7,027,989 B1 * | 4/2006 | Tapadar et al. | ............ | 704/270 |
| 7,246,057 B1 * | 7/2007 | Sundqvist et al. | ............ | 704/219 |
| 7,650,285 B2 * | 1/2010 | Magliaro et al. | ............ | 704/500 |
| 7,742,916 B2 * | 6/2010 | Barriac et al. | ............ | 704/217 |
| 7,830,862 B2 * | 11/2010 | James | ............ | 370/352 |
| 7,908,147 B2 * | 3/2011 | Ivashin et al. | ............ | 704/500 |
| 8,112,285 B2 * | 2/2012 | Magliaro et al. | ............ | 704/500 |
| 2003/0023428 A1 * | 1/2003 | Chang et al. | ............ | 704/201 |
| 2004/0204945 A1 * | 10/2004 | Okuda et al. | ............ | 704/500 |
| 2004/0215448 A1 * | 10/2004 | Funatsu et al. | ............ | 704/201 |
| 2006/0009983 A1 * | 1/2006 | Magliaro et al. | ............ | 704/500 |
| 2006/0271373 A1 * | 11/2006 | Khalil et al. | ............ | 704/500 |
| 2006/0277051 A1 * | 12/2006 | Barriac et al. | ............ | 704/503 |
| 2006/0285557 A1 | 12/2006 | Anderton et al. | | |
| 2007/0116300 A1 * | 5/2007 | Chen | ............ | 381/92 |
| 2007/0150262 A1 * | 6/2007 | Mori et al. | ............ | 704/201 |
| 2008/0285599 A1 * | 11/2008 | Johansson et al. | ............ | 370/516 |
| 2009/0046698 A1 | 2/2009 | Chu et al. | | |

(Continued)

FOREIGN PATENT DOCUMENTS

EP  0637179 A1  2/1995
WO  0141337 A1  6/2001

OTHER PUBLICATIONS

3rd Generation Partnership Project. "Relply LS on CS Voice over HSPA." 3GPP TS-RAN2 Meeting #60bis, Tdoc R2-080564, Sevilla, Spain, Jan. 14-18, 2008.

*Primary Examiner* — Douglas Godbold
(74) *Attorney, Agent, or Firm* — Coats & Bennett, PLLC

(57) ABSTRACT

Methods and apparatus for coordinating audio data processing and network communication processing in a communication device are disclosed. An exemplary method begins with demodulating a series of received communication frames, using a network communication processing circuit, to produce received encoded audio frames. An event report for each of one or more of the received encoded audio frames is generated, the event report indicating a network communication circuit processing time associated with the corresponding received encoded audio frames. The received encoded audio frames are decoded, using an audio data processing circuit, and the decoded audio is output to an audio circuit. The timing of the outputting of the decoded audio is adjusted, based on the generated event reports.

20 Claims, 6 Drawing Sheets

(56) References Cited

U.S. PATENT DOCUMENTS

| | | |
|---|---|---|
| 2009/0135976 A1 | 5/2009 | Ramakrishnan et al. |
| 2010/0054347 A1* | 3/2010 | Schuller et al. ............... 375/259 |
| 2010/0082335 A1* | 4/2010 | Sung et al. .................... 704/203 |
| 2011/0119565 A1* | 5/2011 | Chang et al. .................. 714/776 |

* cited by examiner

MINIMIZING SPEECH DELAY IN COMMUNICATION DEVICES

RELATED APPLICATIONS

This application claims priority under 35 U.S.C. §119(e) to Provisional Patent Application Ser. No. 61/324,956, titled "Minimizing Speech Delay in Communication Devices" and filed 16 Apr. 2010. The entire contents of the foregoing application are incorporated herein by reference.

TECHNICAL FIELD

The present invention relates generally to communication devices and relates in particular to methods and apparatus for coordinating audio data processing and network communication processing in such devices.

BACKGROUND

When a speech call is performed over a cellular network, the speech data that is transferred is typically coded into audio frames according to a voice coding algorithm such as one of the coding modes of the Adaptive Multi-Rate (AMR) codec or the Wideband AMR (AMR-WB) codec, the GSM Enhanced Full Rate (EFR) algorithm, or the like. As a result, each of the resulting communication frames transmitted over the wireless link can be seen as a data packet containing a highly compressed representation of the audio for a given time interval.

FIG. 1 provides a simplified schematic diagram of those functional elements of a conventional cellular phone 100 that are generally involved in a speech call, including microphone 50, speaker 60, modem circuits 110, and audio circuits 150. Here, the audio that is captured by microphone 50 is pre-processed in audio pre-processing circuits 180 (which may include, for example, audio processing functions such as filtering, digital sampling, echo cancellation, or the like) and then encoded into a series of audio frames by audio encoder 160, which may implement for example, a standards-based encoding algorithm such as one of the AMR coding modes. The encoded audio frames are then passed to the transmitter (TX) baseband processing circuit 130, which typically performs various standards-based processing tasks (e.g., ciphering, channel coding, multiplexing, modulation, and the like) before transmitting the encoded audio data to a cellular base station via radio frequency (RF) front-end circuits 120.

For audio received from the cellular base station, the modem circuits 110 receive the radio signal from the base station via the RF front-end circuits 120, and demodulates and decodes the received signals with receiver (RX) baseband processing circuits 140. The resulting encoded audio frames produced by the modem circuits 110 are then processed by audio decoder 170 and audio post-processing circuits 190, and the resulting audio signal is passed to the loudspeaker 60.

An audio frame typically corresponds to a fixed time interval, such as 20 milliseconds. (Audio frames are transmitted/received on average every 20 milliseconds for all voice call scenarios defined in current versions of the WCDMA and GSM specifications). This means that audio circuits 150 produce one encoded audio frame (for transmission to the network) and consume another (received from the network) every 20 milliseconds, on average, assuming a bi-directional audio link. Typically, these encoded audio frames are transmitted to and received from the communication network at exactly the same rate, although not always. In some cases, for example, two encoded audio frames might be combined to form a single communication frame for transmission over the radio link. In addition, the timing references used to drive the modem circuitry and the audio circuitry may differ, in some situations, in which case a synchronization technique may be needed keep the average rates the same, thus avoiding overflow or underflow of buffers. Several such synchronization techniques are disclosed in U.S. Patent Application Publications 2009/0135976 A1 and 2006/0285557 A1, by Ramakrishnan et al. and Anderton et al., respectively. Furthermore, the exact timing relationship between transmission and reception of the communication frames is generally not fixed, at least at the cellular phone end of the link.

The audio and radio processing pictured in FIG. 1 contribute delays in both directions of audio data transmission—i.e., from the microphone to the remote base station as well as from the remote base station to the speaker. Reducing these delays is an important objective of communications network and device designers.

SUMMARY

Methods and apparatus for coordinating audio data processing and network communication processing in a communication device are disclosed. Using the disclosed techniques, the end-to-end delay and audio glitches can be reduced. End-to-end delays may cause participants in a call to seemingly interrupt each other. A delay can be perceived at one end as an actual pause at the other end, and a person at the first end might therefore begin talking, only to be interrupted by the input from the other end having been underway for, say, 100 ms. Audio glitches could result, for instance, if an audio frame is delayed so much that it must be skipped.

An exemplary method for use in coordinating audio data processing and network communication processing of inbound speech data (e.g., the downlink in a mobile phone) begins with demodulating a series of received communication frames, using a network communication processing circuit, to produce received encoded audio frames. An event report for each of one or more of the received encoded audio frames is generated, the event report indicating a network communication circuit processing time associated with the corresponding received encoded audio frames. The received encoded audio frames are decoded, using an audio data processing circuit, and the decoded audio is output to an audio circuit (e.g., including a loudspeaker). Finally, the timing of the outputting of the decoded audio is adjusted, based on the generated event reports.

In some embodiments, this adjusting of the timing of the outputting of the decoded audio comprises determining, based on two or more generated event reports, that a timing drift has occurred, and adjusting the outputting of the decoded audio based on the timing drift. A start time for outputting a frame of the decoded audio may be calculated such that the start time is based on a duration of a frame, a maximum network communication circuit processing time, and a network communication circuit processing time corresponding to one or more of the received encoded audio frames. In some embodiments, the event report for one or more of the received encoded audio frames further indicates a maximum network communication circuit processing time, which may be used, for example, in calculating a start time for outputting one or more of the decoded audio frames.

In some embodiments, the event report for one or more of the received encoded audio frames further indicates a network-related delivery delay relative to a reference delivery schedule having a constant delivery interval. This network-related delivery delay comprises a delay resulting from systematic variances in radio access network timing, in some embodiments, and/or a delay resulting from one or more retransmissions of audio data. The event report may comprise a single delay parameter indicating the sum of the network-related delivery delay and network communication circuit processing time, in some embodiments, or may include separate parameters for each, in other embodiments. In any of these embodiments, adjusting the timing of the outputting of the decoded audio is further based on the network-related delivery delay. This adjusting of the timing of the outputting of the decoded audio may comprise determining, based on two or more generated event reports, that a timing drift has occurred, and adjusting the outputting of the decoded audio based on the timing drift to compensate for at least a portion of it. In some embodiments, a start time for outputting a frame of the decoded audio may be calculated based on a frame duration, a maximum delay parameter, and the delay parameter corresponding to one or more of the received encoded audio frames.

Communication devices containing one or more processing circuits configured to carry out the above-summarized techniques and variants thereof are also disclosed. Of course, those skilled in the art will appreciate that the present invention is not limited to the above features, advantages, contexts or examples, and will recognize additional features and advantages upon reading the following detailed description and upon viewing the accompanying drawings.

DETAILED DESCRIPTION

In the discussion that follows, several embodiments of the present invention are described herein with respect to techniques employed in a cellular telephone operating in a wireless communication network. However, the invention is not so limited, and the inventive concepts disclosed and claimed herein may be advantageously applied in other contexts as well, including, for example, a wireless base station, or even in wired communication systems. Those skilled in the art will appreciate that the detailed design of cellular telephones, wireless base stations, and other communication devices may vary according to the relevant standards and/or according to cost-performance tradeoffs specific to a given manufacturer, but that the basics of these detailed designs are well known. Accordingly, those details that are unnecessary to a full understanding of the present invention are omitted from the present discussion.

Furthermore, those skilled in the art will appreciate that the use of the term "exemplary" is used herein to mean "illustrative," or "serving as an example," and is not intended to imply that a particular embodiment is preferred over another or that a particular feature is essential to the present invention. Likewise, the terms "first" and "second," and similar terms, are used simply to distinguish one particular instance of an item or feature from another, and do not indicate a particular order or arrangement, unless the context clearly indicates otherwise.

As was noted above with respect to FIG. 1, the modem circuits and audio circuits of a cellular telephone (or other communications transceiver) introduce delays in the audio path between the microphone at one end of a communication link and the speaker at the other end. Of the total round-trip delay in a bi-directional link, the delay introduced by a cellular phone includes the time from when a given communication frame is received from the network until the audio contained in that frame is reproduced on the loudspeaker, as well as the time from when audio from the microphone is sampled until that sampled audio data is encoded and transmitted over the network. Additional delays may be introduced at other points along the overall link as well, so minimizing the delays introduced at a particular node can be quite important.

Figure 1:
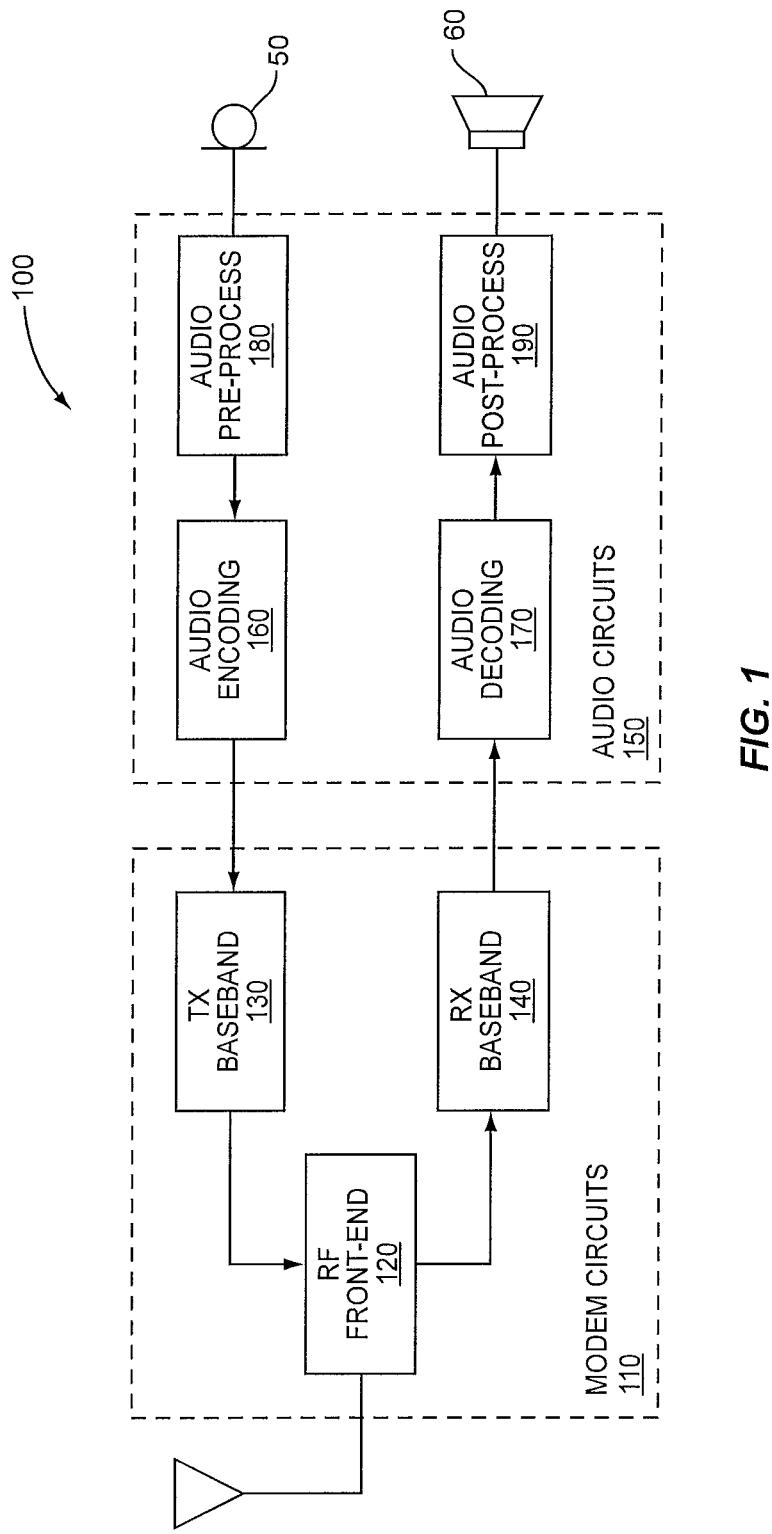
FIG. 1 is a block diagram of a cellular telephone.

Although FIG. 1 illustrates completely distinct modem circuits 110 and audio circuits 150, those skilled in the art will appreciate that the separation need not be a true physical separation. In some devices, for example, some or all of the audio encoding and decoding processes may be implemented on the same application-specific integrated circuit (ASIC) used for TX and RX baseband processing functions. In others, however, the baseband signal processing may reside in a modem chip (or chipset), while the audio processing resides in a separate application-specific chip. In some cases, regardless of whether the audio processing and baseband signal processing are on the same chip or chipset, the audio processing functions and radio functions may be driven by timing signals derived from a common reference clock. In others, these functions may be driven by separate clocks.

Figure 2:
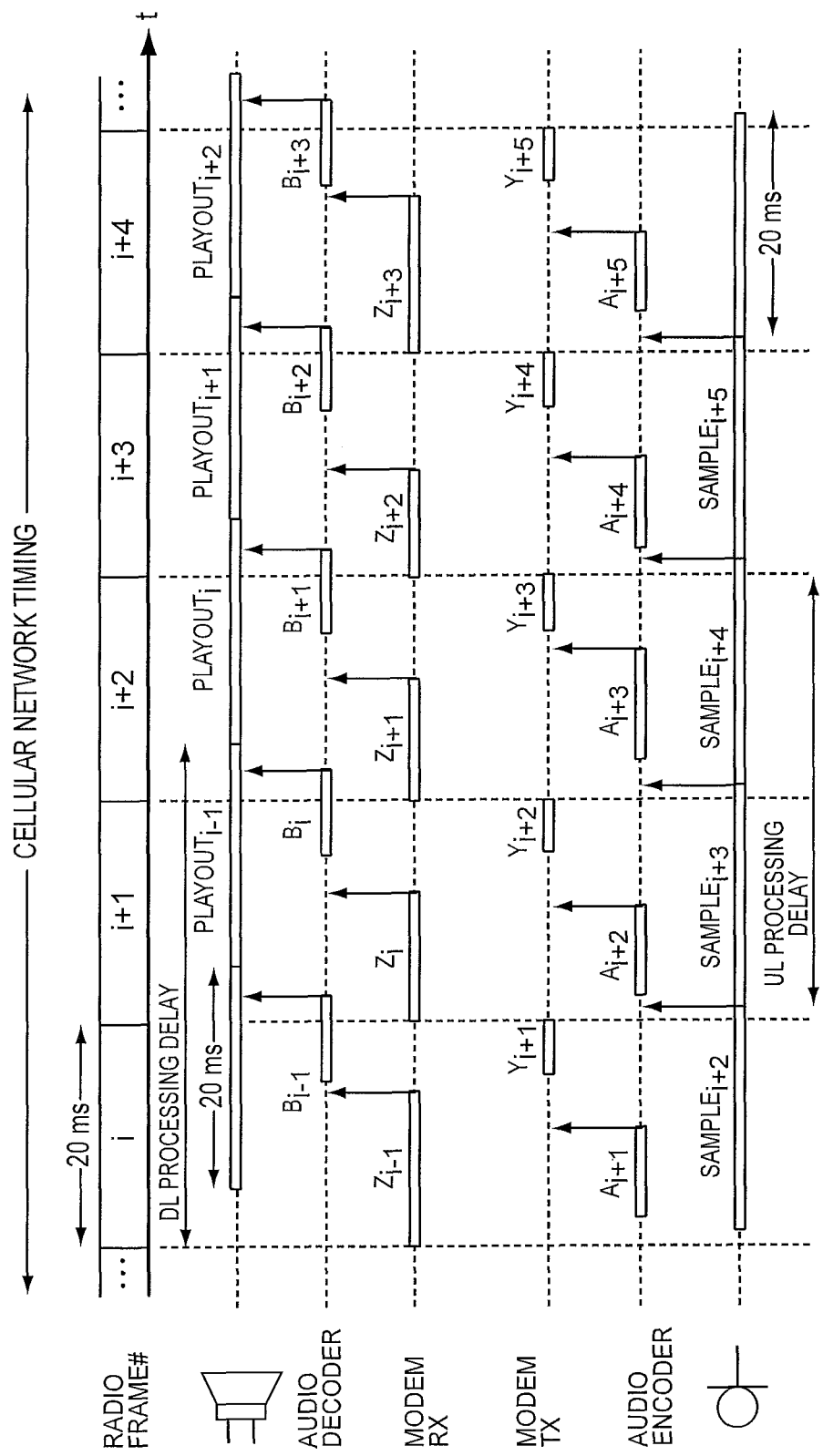
FIG. 2 illustrates audio processing timing related to network processing and frame timing in a communications network.

FIG. 2 illustrates how the processing times of the audio processing circuits and modem circuits relate to the network timing (i.e., the timing of a communications frame as "seen" by the antenna) during a speech call. In this example scenario, the radio frames and corresponding audio frames are 20 milliseconds long; in practice these durations may vary depending, for instance, on the network type. For simplicity, it is assumed that the radio frame timing is exactly the same in both directions of the radio communications link. Of course, this is not necessarily the case, but will be assumed here as it makes the illustration easier to understand. The assumption has no impact on the operation of the invention and it shall not be considered as limiting the scope thereof.

In FIG. 2, each radio frame is numbered with i, i+1, i+2, etc., and the corresponding audio sampling, playback, audio encoding, and audio decoding processes, as well as the corresponding radio processes, are referenced with corresponding indexes. Thus, for example, it can be seen at the bottom of the figure that for radio frame i+2, audio data to be transmitted over the air interface is first sampled from the microphone over a 20-millisecond interval denoted $Sample_{i+2}$. An arrow at the end of that interval indicates when the speech data (often in the form of Pulse-Code Modulated data) is available for audio encoding. In the next step (moving up, in FIG. 2) it is processed by the audio encoder during a processing time interval denoted $A_{i+2}$. The arrow at the end of this interval indicates that the encoded audio frame can be sent to the transmitter processing portion of the modem circuit, which performs its processing during a time interval denoted $Y_{i+2}$. As can be seen from the figure, the modem processing time interval $Y_{i+2}$ does not need to immediately follow the audio encoding time interval $A_{i+2}$. This is because the modem processing interval is tied to the transmission time for radio frame i+2; this will be discussed in further detail below.

The rest of FIG. 2 illustrates the timing for processing received audio frames, in a similar manner. The modem processing time interval for a received radio frame k is denoted $Z_k$ while the audio processing time is denoted $B_k$. The interval during which the received audio data is reproduced on the speaker is denoted $Playout_k$.

The $Playout_k$ and $Sample_k$ intervals must generally start at a fixed rate to sample and playback a continuous audio streams for the speech call. In the exemplary system described by FIG. 2, these intervals recur every 20 milliseconds. However, the various processing times discussed above ($A_k$, $B_k$, $Y_k$, and $Z_k$) may vary during a speech call, depending on such factors as the content of the speech signal, $Sample_k$, the quality of the received radio signal, the channel coding and speech coding used, the number and types of other processing tasks being concurrently performed by the processing circuitry, and so on. Thus, there will generally be jitter in the timing of the delivery of the audio frames between the audio processing and modem entities.

Because of the sequential nature of the processing, several relationships apply among the various processing times. First, for the outbound processing, the modem transmit processing interval $Y_k$ must end no later than the beginning of the corresponding radio frame. Thus, the latest start of the modem transmit processing interval $Y_k$ is driven by the radio frame timing and the maximum possible time duration of $Y_k$. This means that the corresponding audio processing interval $A_k$ should start early enough to ensure that is completed, under worst case conditions, prior to this latest start time for the modem transmit processing interval. Accordingly, the optimal start of the audio sampling interval $Sample_k$, relative to the frame time, is determined by the maximum time duration of $Y_k + A_k$ in order to ensure that an encoded audio frame is available to be sent over the cellular network.

For inbound processing, the start of the modem receive processing interval ($Z_k$)) is dictated by the cellular network timing (i.e., by the radio frame timing at the receive antenna) and is outside the control of the cellular telephone. Second, the start of the audio playback interval $Playout_k$, relative to the radio frame timing, should advantageously be no earlier than the maximum possible duration of the modem receive processing interval $Z_k$ plus the maximum possible duration of the audio processing interval $B_k$, in order to ensure that decoded audio data is always available to be sent to the speaker.

Figure 4:
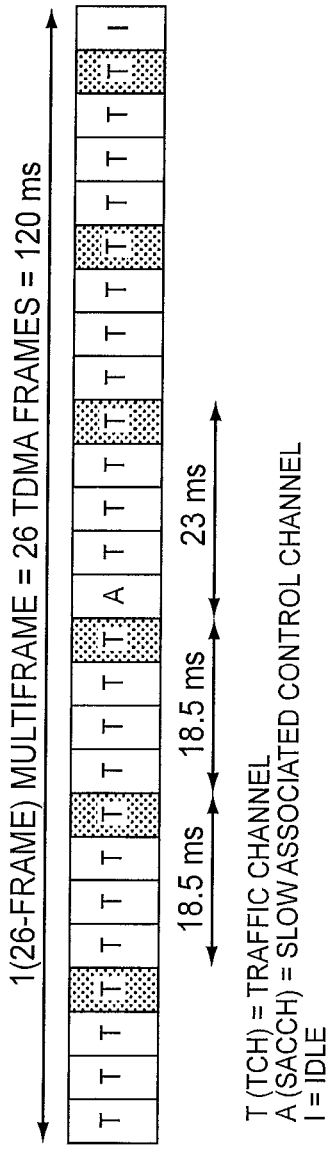
FIG. 4 illustrates frame timing in a GSM multiframe.

Looking more closely at the inbound (downlink) processing chain in FIG. 2, those skilled in the art will appreciate that the start of each modem receive processing interval $Z_k$ may differ from an exact 20-millisecond timing due to various factors, e.g. network jitter and modem processing times. For example, some variation might arise from variations in the transmission time used by the underlying radio access technology. One example is in GSM systems, where the transmission of two consecutive speech frames is not always performed with a time difference of exactly 20 milliseconds, because of the details of the frame/multi-frame structure of GSM's TDMA signal. The GSM timing for a 26-frame multiframe is illustrated in FIG. 4. A full speech frame is transmitted every fourth traffic channel (TCH) frame. As the figure suggests, this means that a speech frame is not available for modem processing exactly every 20 milliseconds. Instead the audio frames arrive at intervals of 18.5, 18.5, and 23 milliseconds; this pattern repeats every 60 milliseconds.

Figure 5:
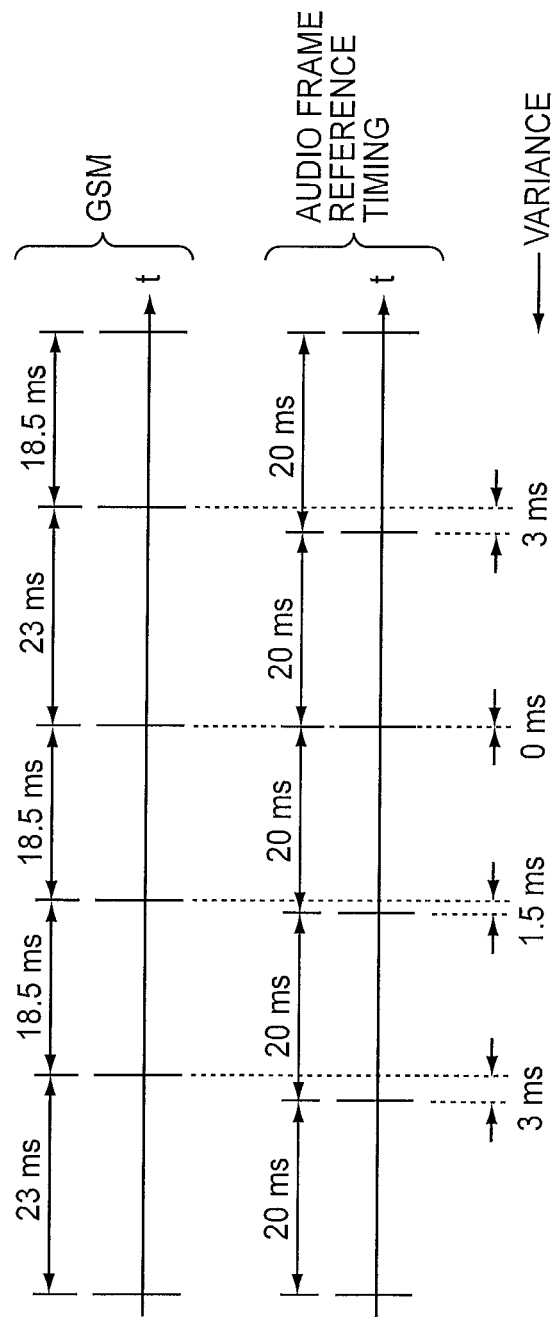
FIG. 5 illustrates processing delay variations arising from the GSM multiframe timing.

From the perspective of the audio processing portion of a communications device receiving a GSM signal it can be assumed that the audio frame timing base is set to exactly 20 milliseconds and that any variations in transmission times in the underlying radio access technology is hidden within the modem processing portion of the device. In this case, these variations are captured in the modem receive processing interval $Z_k$ of FIG. 2. Thus, the intervals $Z_k$ are subject to systematic variations of either 0, 1.5 or 3 milliseconds, even before the actual modem processing time is accounted for. This is shown in detail in FIG. 5, where the GSM frame timing is compared to a fixed reference schedule for audio frame timing, with constant 20-millisecond inter-frame intervals. As can be seen, the uneven GSM frame timing results in a pattern of variances between the GSM frame timing and the reference schedule for the audio frame timing, with the variances ranging from 0 to 3 milliseconds. This is provided as an example and the specifics shall not be construed as limiting the scope of the invention.

Figure 6:
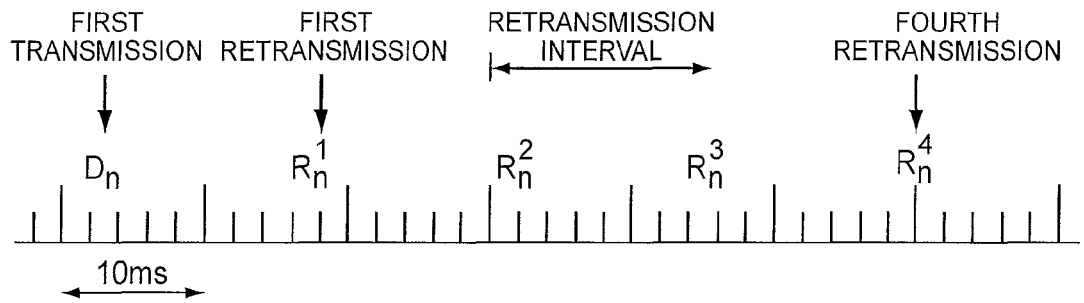
FIG. 6 illustrates potential delays arising from retransmissions in an HSPA system.

Another source of variations in arrival time of speech frames to the modem could be re-transmissions over the radio interface. This might arise, for instance, when the speech frames are transported on a High-Speed Packet Access (HSPA) channel in a Wideband Code-Division Multiple Access (WCDMA) system, which uses HARQ (Hybrid automatic repeat request) re-transmissions to correct improperly received data packets. The variation in this case depends on how many times all or part of a speech frame is transmitted over the radio interface before it is correctly received by the modem—delays from such retransmissions can exceed 100 milliseconds in some cases. FIG. 6 shows an example. Here, each WCDMA frame has a duration of 10 ms and contains 15 slots, organized into 5 subframes of 3 slots each. An HSPA frame is received over one-subframe of 3 slots (2 milliseconds). Initially the speech frame is sent at sub-frame $D_n$, as shown in FIG. 6. If this first transmission is not successfully decoded in the modern, the receiving device requests a re-transmission of the frame, which occurs no earlier than sub-frame $R_n^1$. If this transmission also fails, a second re-transmission can be done at sub-frame $R_n^2$ and so on up until an upper limit of, for example, four subframes. In the illustrated scenario of four retransmissions, the delay from retransmissions alone is 56 milliseconds.

Thus, the apparent modem processing time $Z_k$ (from the perspective of an audio processing circuit "expecting" the delivery of audio frames on a fixed schedule) is a result of at least two different components: radio timing jitter caused by such things as network timing irregularities and/or data retransmissions, and the actual time used by modem circuitry to process the received radio frames.

As discussed earlier, to avoid, for instance, interrupting between parties at each end of a speech call, delays should be kept as small as possible. Accordingly, it is beneficial to synchronize each of the audio exncoding and decoding processes with the corresponding uplink and downlink cellular network timing in such a way that reduces this delay. In the event that the audio processes are not synchronized with the communication frame timing in this manner (e.g., in the event that the audio processing timing is arbitrarily established, relative to the communication frame timing), the delay introduced in addition to the processing times $A_k$, $B_k$, $Y_k$, and $Z_k$ would then vary between 0 and 20 milliseconds in each direction (with a mean value of 10 milliseconds). The reason for this is that both the sampling of the audio frames from the microphone and the playback of the audio data from received audio frames on the speaker must be at a fixed repetition rate and performed each 20 milliseconds, in order to avoid gaps in the audio stream. If, for example, the sampling is begun such that the subsequent speech encoding is completed 12 milliseconds before processing time $Y_k$ must start, then a constant (and unnecessary) delay of 12 milliseconds is introduced.

To introduce as little end-to-end delay as possible the total processing times should be minimized. Furthermore, the time between finishing the processing in one processing unit (e.g., the radio modem) and starting at the next (e.g., the audio processing unit) should be kept as small as practical. Of course, some margin should be provided to account for small jitters in the processing times, as well as to provide any necessary time for transferring data between different subsystems (e.g., between processing units using different CPUs and memories). Additional margins might also be used to account for network-related jitter, as well. However, systematic time intervals during which the data is simply waiting for the next processing step should be minimized.

Accordingly, when designing a cellular phone or other communications transceiver that supports speech communications, techniques for determining the best start times for audio sampling processes and audio playout processes, as well as the best start times for audio encoding and decoding processes, are important. In other words, referring once more to the exemplary scenario of FIG. 2, the start of the processing intervals $A_k$ and $B_k$ should be carefully selected so that the end-to-end delay is kept low (to get good audio quality) and to ensure that no time gap (or interruption time) is present in either direction of the audio flow. Of course, as discussed above, these start times must be selected based on the various processing times for the particular equipment, as well as on the cellular network timing. Because these processing times as well as the network timing can change during the speech call (e.g., as the result of a handover between cellular technologies such as GSM and WCDMA), some speech interruption times may be unavoidable. Even in these situations, however, the techniques described herein may be used to keep these interruptions as short as possible. In particular, as will be described in more detail below, these techniques may be used to change the synchronization between audio processes and network timing, in response to such changes in the system timing or in processing times, to keep the end-to-end delays as short as possible.

To put the techniques of the present invention in perspective, a review of alternative approaches to the problem described herein may be useful. One possible approach to determining the start time of the audio playout, relative to the cellular network frame timing, is based on determining in advance the maximum possible time duration for each of the processing times in the inbound processing chain. Thus, for example, the maximums for each of the processing intervals $B_k$ and $Z_k$, as discussed above with respect to FIG. 2, are determined. Then, frame timing can effectively be transferred from the modem circuitry to the audio processing circuitry by sending continuous events (e.g., synchronous pulses) from the modem circuit to the audio processing circuit. In other words, timing between the modem circuit and the audio processing circuit is synchronized, using a dedicated synchronization signal. Given an accurate synchronization signal, it becomes straightforward to calculate forward to determine the playout timing, based on the maximum processing durations. If it is assumed that the timing event jitter is zero (i.e., perfect synchronization between the modem and audio processing circuits), and if it is further assumed that both the uplink and downlink are synchronized in time (again, a simplifying assumption only), then if the synchronization event is sent precisely at the radio frame boundary then the beginning of playout for each audio frame should be scheduled for exactly $B_{k\text{-}max}+Z_{k\text{-}max}$ milliseconds after the synchronization event for the corresponding radio frame.

Variants of this approach are used today in some GSM and WCDMA systems, where timing signals are generated every 20 ms to trigger speech encoding and decoding activities. However, a drawback of this approach is that timing must be accurately synchronized between the modem circuits and the audio processing circuits of a cellular phone. This is not difficult when these two parts are tightly integrated. However, in some devices the modem processing and audio processing may be carried out on separate hardware subsystems, making it more difficult and more expensive to achieve accurate time synchronization between the two processing units. To minimize signaling between the two units, communication between the two parts could be limited to a signal/message-based communication channel where the transport of the signals/messages jitters in time. While this communication channel could be used to send a time synchronization message periodically, it may remain difficult to get an accurate time transfer, due to jitter. The result is that larger timing margins must be utilized, to account for this increased jitter, with the consequence of greater end-to-end delays. Furthermore, this jitter, as well as the maximum processing times of the modem circuit and the audio circuit, may not remain the same throughout the lifetime of a speech call, and could change depending on what parallel processes are currently being managed by the modem and audio circuitries. Thus, it may be quite difficult to minimize the additional delay not related to the actual processing steps a system using this approach.

A simpler approach is to ignore the network timing completely, and simply fix the beginning of the decoding and playout processes to an arbitrary start time, repeated every 20 milliseconds. As suggested above, however, this approach has the drawback that the introduced delay is random, and that the total unnecessary delay for the downlink alone could be as much as 20 milliseconds. These delays can degrade the audio quality significantly. These delays can be much worse if the system is configured to account for worst-case retransmission times (e.g., 100 milliseconds) in a system such as HSPA—in such a system, speech frames that are received successfully in the first instance are buffered for 100 milliseconds to allow a guaranteed delivery of decoded audio frames at 20-millisecond intervals. Such an approach obviously adds a systematic delay of greater than 100 milliseconds to voice calls carried over HSPA.

In several embodiments of the present invention, a different approach is taken to coordinating audio data processing and network communication processing in cellular phones or other communication devices in which audio data is exchanged periodically over a communications link. This approach is particularly applicable to devices in which two physically separate circuits, e.g., an audio processing circuit and a modem circuit, are involved in the processing of the audio data, but those skilled in the art will appreciate that the techniques described in detail below are not necessarily limited to such devices.

Figure 3:
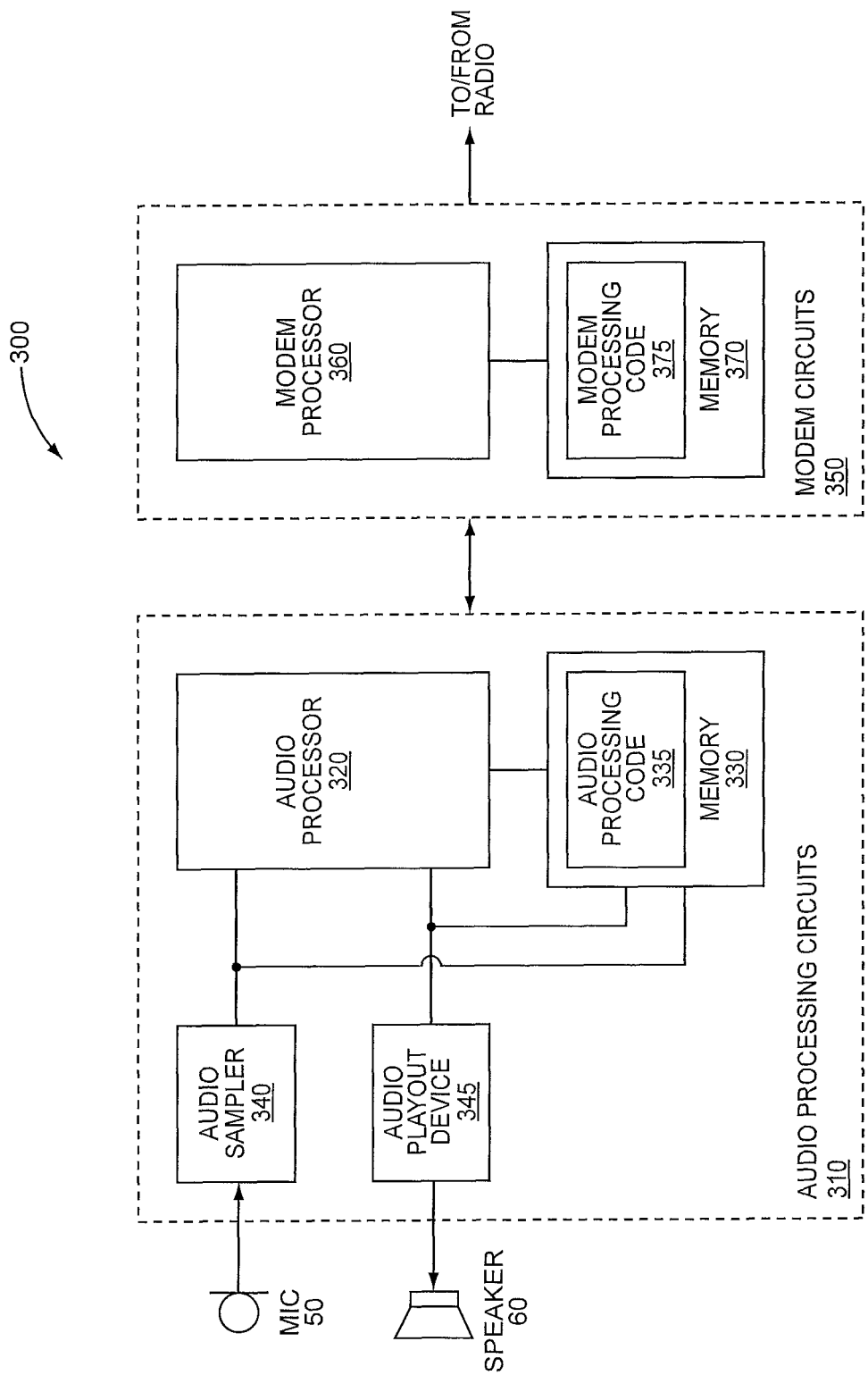
FIG. 3 is a block diagram of elements of an exemplary communication device according to some embodiments of the invention.

A block diagram illustrating functional elements of one such device is provided in FIG. 3, which shows a communication device 300 including an audio processing circuit 310 communicating with a modem circuit 350, via a bi-directional message bus. The audio processing circuit 310 includes an audio sampling device 340, coupled to microphone 50, and audio playout device 345 (e.g., a digital-to-analog converter) coupled to speaker 60, as well as an audio processor 320 and memory 330. Memory 330 stores audio processing code 335, which comprises program instructions for use by audio processor 320. Similarly, modem circuit 350 includes modem processor 360 and memory 370, with memory 370 storing modem processing code 375 for use by the modem processor 360. Either of audio processor 320 and modem processor 360 may comprise one or several microprocessors, microcontrollers, digital signal processors, or the like, configured to execute program code stored in the corresponding memory 330 or memory 370. Memory 330 and memory 370 in turn may each comprise one or several types of memory, including read-only memory, random-access memory, flash memory, magnetic or optical storage devices, or the like. In some embodiments, one or more physical memory units may be shared by audio processor 320 and modem processor 360, using memory sharing techniques that are well known to those of ordinary skill in the art. Similarly, one or more physical processing elements may be shared by both audio processing and modem processing functions, again using well-known techniques for running multiple processes on a single processor. Other embodiments may have physically separate processors and memories for each of the audio and modem processing functions, and thus may have a physical configuration that more closely matches the functional configuration suggested by FIG. 3.

As discussed in more detail below, certain aspects of the techniques described herein for coordinating audio data processing and network communication processing are implemented using control circuitry, such as one or more microprocessors or microcontrollers configured with appropriate firmware or software. This control circuitry is not pictured separately in the exemplary block diagram of FIG. 3 because, as will be readily understood by those familiar with such devices, the control circuitry may be implemented using audio processor 320 and memory 330, in some embodiments, or using modem processor 360 and memory 370, in other embodiments, or some combination of both in still other embodiments. In yet other embodiments, all or part of the control circuitry used to carry out the various techniques described herein may be distinct from both audio processing circuits 310 and modem circuits 350. Those knowledgeable in the design of audio and communications systems will appreciate the engineering tradeoffs involved in determining a particular configuration for the control circuitry in any particular embodiment, given the available resources.

In various embodiments of the present invention, audio data for each frame flowing from modem circuit 350 to the audio processing circuit is accompanied by an event report. In some embodiments the event report indicates how much processing time that the modem circuit 350 has used in processing the current frame. In some embodiments, the event report further includes an indication of the maximum processing time that the modem circuit 350 could use, given the current configuration. In other embodiments, this maximum processing time may be provided separately, such as at call setup. In either case, these two pieces of timing information permit the worst-case timing for subsequent frames to be accurately predicted. Thus, this timing information can be used by the audio processing circuit 310 to accurately determine an appropriate starting time for the playout of the audio data, such that a continuous audio signal can be sent to loudspeaker 60 without any gaps.

In other embodiments of the invention, the event report includes information indicating, directly or indirectly, a time difference between the delivery of the audio frame data by the modem and an "ideal" reference delivery time. Thus, for example, the event report provides information specifying how "late" the audio frame delivery is compared to a fixed schedule having 20-millisecond delivery intervals. In some embodiments, the reference schedule corresponds to an idealized frame receipt time at the input of the modem circuitry or an idealized transmit time for each frame, in which case the event report might report a delay value of greater than zero for each audio frame, the delay value indicating the total processing time in the modem as well as any network-related jitter, such as systematic jitter introduced by uneven frame timing structures or retransmission-induced variable delays. In some of these embodiments, the modem processing delays and network-related delays may be reported separately, while in others a single, combined value may be used.

Following is a detailed explanation of exemplary processes and corresponding signal flows for coordinating audio data processing and network communication processing for the inbound signal flow direction. For convenience, the discussion below is provided in the context of a cellular phone, so that the inbound signal flow corresponds to the radio downlink, but those skilled in the art will appreciate that the inventive techniques described are not limited to this context. The techniques illustrated in these exemplary procedures may be more generally applied to make it possible for an audio processing circuit in a communications transceiver to determine an appropriate start time for audio playout processes, so that delays in the end-to-end audio path are kept small while reducing undesirable gaps or other glitches in the speech.

Figure 8:
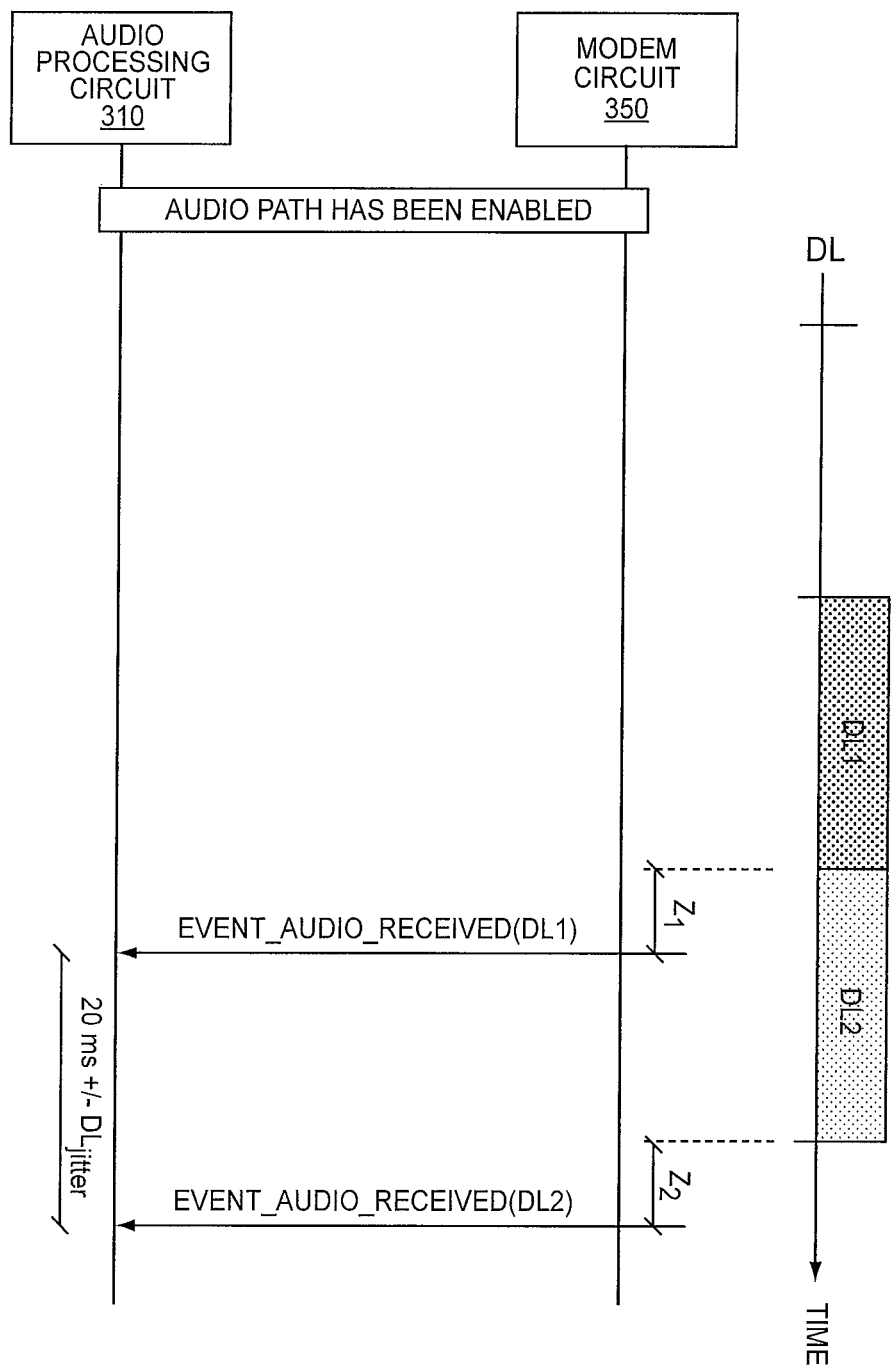
FIG. 8 illustrates an exemplary signal flow between an audio processing circuit and a modem circuit.

In the downlink audio path, received decoded audio frames are transferred from the modem circuit 350 to the audio processing circuit 310 as part of or accompanied by an event report message called "EVENT_AUDIO_RECEIVED." Two of such events are illustrated in the bottom half of FIG. 8, which illustrates an exemplary signaling flow and the corresponding communication frame timing. (FIG. 8 illustrates timing for inbound, or downlink, processing only—details related to uplink timing have been omitted for simplicity.) These event reports are generally sent immediately after the modem processing is completed, but due to variable processing delay the exact timing of this event report, relative to the communication frame timing (on the right-hand side of FIG. 8), will jitter as described further below.

As can be seen in FIG. 8, the downlink jitter ($DL_{jitter}$) depends at least upon the processing time $Z_k$ of the modem circuit 350, which may differ between every frame. Furthermore, as discussed above, other variable delays may occur as a result of the radio access technology configuration, which may deliver consecutive frames at uneven inter-arrival times, or as a result of retransmissions of unsuccessfully received frames. Thus, as seen in FIG. 8, the timing between the first event report message, EVENT_AUDIO_RECEIVED(DL1), and the second event report message, EVENT_AUDIO_RECEIVED(DL2), depends on the delays $Z_1$ and $Z_2$, for downlink frames DL1 and DL2, respectively. The interval between the first and second event reports is 20 milliseconds plus the difference between $Z_2$ and $Z_1$; this difference is the jitter.

A maximum value for the modem processing time Z (or for the sum of modem processing time and network-related jitter) can be defined as $Z_{max}$. An indication of the value of $Z_{max}$ can be provided to the audio processing circuit 310 either at call set-up or as described below. In a GSM mobile device, $Z_{max}$ might be around 3 or 4 milliseconds, depending on the TDMA frame structure. In a WCDMA mobile, $Z_{max}$ might be closer to 10 milliseconds, depending on which transport channels are received simultaneously, and further depending on how the decoding scheduling is done. For audio transmitted over an HSPA link, $Z_{max}$ might be as much as 106 milliseconds, to accommodate the maximum number of allowed retransmissions.

The processing time is, of course, also dependent on the processing capabilities for a given device, such as clock/processor/memory speeds, etc. When the receive processing of a downlink communications frame in modem circuit 350 is completed, a parameter is included as part of the event report EVENT_AUDIO_RECEIVED; this parameter indicates the current value of the decoding processing time $Z_k$, i.e., the processing time corresponding to the current frame of encoded audio data. With this information (the current processing time $Z_k$ and the maximum processing time $Z_{max}$), the audio processing circuit 310 can determine, after receipt of the very first audio frame, when the audio playout should be scheduled to start in order to get a continuous, low-delay, audio stream. As the speech call continues, the audio processing circuit 310 can use the timing information provided by subsequent event reports to determine whether a time drift has been introduced or a timing change has occurred due to a handover from one cell to another, and whether a further adjustment to the playout timing is necessary. This could happen, for example, if the modem circuit 350 and the audio processing circuit 310 use different clocks, if the modulation scheme changes, or if a handoff results in a substantially different frame timing.

In some embodiments, changes in the value of $Z_{max}$ are indicated in the event report generated for a given frame. This might occur, for example, if the radio link technology or modulation scheme changes during the call. The audio processing circuit may use this revised value of $Z_{max}$, along with the current value of $Z_k$, to determine whether the timing of the outputting of the decoded audio should be adjusted. For example, if the maximum processing time $Z_{max}$ is 10 milliseconds, and the current processing time $Z_k$ received in the EVENT_AUDIO_RECEIVED message is 3 milliseconds, then the audio processing circuit 310 can readily compute that the maximum possible time until the next frame of encoded audio data will be received is 20+10−3=27 milliseconds. This information is used along with the maximum audio processing time (for decoding, etc.) to determine the optimal start time of the playout of the current audio frame. If the currently scheduled start time is too early or substantially too late, it can be adjusted to the appropriate time to prevent a situation in subsequent frames in which the playout buffer is starved (underflow) or in which unnecessary delay is introduced, respectively.

Often, such as during conventional (i.e., circuit-switched) GSM or WCDMA speech calls, the maximum jitter in the downlink is not so large, so the techniques described can be used throughout the complete call. For example, the maximum jitter might be set to 10 milliseconds for a WCDMA connection, while the current jitter indicated by the EVENT_AUDIO_RECEIVED message is 3 milliseconds. The maximum time until the next message will be received is 27 milliseconds (20+10−3), and the start of outputting the decoded audio can easily be adjusted accordingly.

In the HSPA scenario, however, the theoretical maximum jitter can be quite large, due to retransmissions and other network-related delays. In this case, the audio processor could use an adaptive jitter buffer instead to adaptively adjust the playout buffer size to reduce the delay for terminals in "good" radio environments (i.e. for terminals experiencing few re-transmissions), and to increase the delay for terminals in relatively bad radio environments. For example, in the event that the value of Z reported by the modem during a certain time period is consistently in the range of 10 to 20 milliseconds, the adaptive buffer would adjust the buffer size to introduce a delay of 40 milliseconds, for example, rather than the 110 milliseconds that would account for the worst-case delay. Of course, such an approach must be able to accommodate the occasional late-arriving packet and may as a consequence of several late-arriving packets increase the buffer size to a suitable value above 40 ms.

Figure 7:
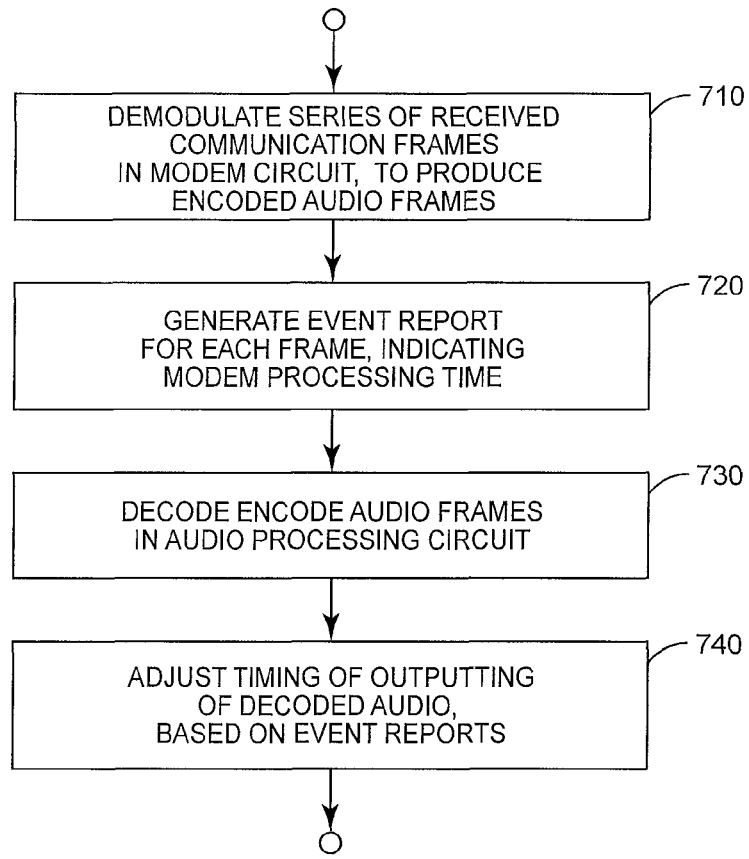
FIG. 7 is a process flow diagram illustrating another exemplary method for coordinating audio data processing and network communication processing in a communication device.

FIG. 7 is a processing flow diagram illustrating an exemplary method for coordinating audio data processing and network communication processing for the inbound (e.g., downlink) speech path in a communication device. This method may be implemented, for example, in the device 300 illustrated in FIG. 3. As shown at block 710, the illustrated process begins with demodulating a series of received communication frames, using a network communication processing circuit, to produce received encoded audio frames. An event report for each of one or more of the received encoded audio frames is generated, as shown at block 720, the event report indicating a network communication circuit processing time associated with the corresponding received encoded audio frames; as discussed above, this processing time may include network- and/or retransmission-related delays, in some embodiments, while in others such delays may be reported separately. The received encoded audio frames are decoded, using an audio data processing circuit, as shown at block 730, and the decoded audio is output to an audio circuit (e.g., a loudspeaker). Finally, the timing of the outputting of the decoded audio is adjusted, based on the generated event reports, as shown at block 740.

With these techniques, synchronization between the audio processing timing and the network frame timing can be achieved such that end-to-end delay is reduced and audio discontinuities are reduced. Those skilled in the art will appreciate that during call set-up the radio channels carrying the audio frames are normally established well before the call is fully connected. Thus, if the modem circuit 350 is configured so that no audio frames provided from the audio processing circuit 310 are actually transmitted until the call is fully connected, an optimal timing can be achieved from the start of the call.

As suggested above, these techniques will handle the case where the modem circuit and audio processing circuits use different clocks, so that there is a constant drift between the two systems. However, these techniques are useful for other reasons, even in embodiments where the modem and audio processing circuits share a common time reference. As discussed above, these techniques may be used to establish the initial timing for audio decoding and playback, at call set-up. These same techniques can be used to readjust these timings in response to handovers, whether inter-system or intra-system (e.g., WCDMA timing re-initialized hard handoff). Further, these techniques may be used to adjust the synchronization between the audio processing and the modem processing in response to variability in processing loads and processing jitter caused by different types and numbers of processes sharing modem circuitry and/or audio processing circuitry.

Although the present inventive techniques are described in the context of a circuit-switched voice call, those skilled in the art will appreciate that these techniques may also be adapted for other real-time multimedia use cases such as video telephony and packet-switched voice-over-IP. Indeed, given the above variations and examples in mind, those skilled in the art will appreciate that the preceding descriptions of various embodiments of methods and apparatus for coordinating audio data processing and network communication processing are given only for purposes of illustration and example. As suggested above, one or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the processes described above, or variants thereof. In some embodiments, these processing circuits may comprise customized hardware to carry out one or more of the functions described above. Other embodiments of the invention may include computer-readable devices, such as a programmable flash memory, an optical or magnetic data storage device, or the like, encoded with computer program instructions which, when executed by an appropriate processing device, cause the processing device to carry out one or more of the techniques described herein for coordinating audio data processing and network communication processing. Those skilled in the art will recognize, of course, that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method, performed in a communication device operative in a communication network, for coordinating audio data processing and network communication processing within the communication device, the method comprising:
   receiving a first communication frame from the network;
   demodulating a the first received communication frame, using a network communication processing circuit in the communication device, to produce a first received encoded audio frame;
   generating a first event report for the first received encoded audio frame, the event report indicating a network communication circuit processing time indicating a duration spent processing the first received encoded audio frame in the network communication processing circuit in the communication device;
   decoding the first received encoded audio frame using an audio data processing circuit in the communication device, and outputting the decoded audio to an audio circuit in the communication device; and
   adjusting a timing of the outputting of the decoded audio to the audio circuit based on the first generated event report.

2. The method of claim 1, wherein the first event report for the first received encoded audio frame comprises all or a part of the encoded audio data for the corresponding encoded audio frame.

3. The method of claim 1, further comprising receiving and processing a second a communication frame, and generating a second event report indicating the time spent processing the second received encoded audio frame in the network communication processing circuit in the communication device, wherein adjusting the timing of the outputting of the decoded audio comprises determining, based on the first and second generated event reports, that a timing drift has occurred, and adjusting the outputting of the decoded audio based on the timing drift to compensate for at least a portion of the timing drift.

4. The method of claim 1, wherein said adjusting comprises calculating a start time for outputting the first frame of the decoded audio based on a frame duration, a maximum network communication circuit processing time, and a network communication circuit processing time corresponding to the first received encoded audio frame.

5. The method of claim 1, wherein the first event report further indicates a maximum network communication circuit processing time indicating a maximum allowable time that the network communication processing circuit in the communication device should spend processing the first received encoded audio frame.

6. The method of claim 1, wherein the first event report further indicates a network-related delivery delay relative to a reference delivery schedule having a constant intra-delivery interval, and wherein said adjusting the timing of the outputting of the decoded audio is further based on the network-related delivery delay.

7. The method of claim 6, wherein the network-related delivery delay comprises a delay resulting from systematic variances in radio access network timing, or a delay resulting from one or more retransmissions of audio data, or both.

8. The method of claim 6, wherein the first event report comprises a delay parameter indicating the sum of the network-related delivery delay and network communication circuit processing time.

9. The method of claim 6, further comprising receiving and processing a second a communication frame, and generating a second event report indicating the time spent processing the second received encoded audio frame in the network communication processing circuit in the communication device, wherein said adjusting the timing of the outputting of the decoded audio comprises determining, based on the first and second generated event reports, that a timing drift has occurred, and adjusting the outputting of the decoded audio based on the timing drift.

10. The method of claim 6 wherein said adjusting comprises calculating a start time for outputting the first frame of the decoded audio based on a frame duration, a maximum delay parameter, and the delay parameter corresponding to a received encoded audio frame.

11. A communication device, comprising:
    a network communication processing circuit configured to receive and demodulate a first communication frame to produce a first received encoded audio frame and to generate a first event report for the first received encoded audio frame, the first event report indicating a duration spent processing the first received encoded audio frame in the network communication processing circuit; and
    an audio data processing circuit configured to decode the first received encoded audio frame and output the decoded audio to an audio circuit, and to adjust the timing of the output of the decoded audio to the audio circuit based on the first generated event report.

12. The communication device of claim 11, wherein the first event report comprises all or a part of the encoded audio data for the corresponding frame.

13. The communication device of claim 11, wherein the network communication processing circuit is further configured to receive and demodulate a second communication frame to produce a second received encoded audio frame and to generate a second event report indicating a duration spent processing the second received encoded audio frame in the network communication processing circuit, and wherein the audio data processing circuit is configured to adjust the timing of the outputting of the decoded audio by determining, based on the first and second generated event reports, that a timing drift has occurred, and adjusting the outputting of the decoded audio based on the timing drift to compensate for at least a portion of the timing drift.

14. The communication device of claim 11, wherein the audio data processing circuit is configured to adjust timing of the outputting of the decoded audio by calculating a start time for outputting the first frame of the decoded audio based on a frame duration, a maximum network communication circuit processing time, and a network communication circuit processing time corresponding to the first received encoded audio frame.

15. The communication device of claim 11, wherein the event report for the first received encoded audio frames further indicates a maximum allowable time that the network communication circuit processing circuit should spend processing the first received encoded audio frame.

16. The communication device of claim 11, wherein the first event report further indicates a network-related delivery delay relative to a reference delivery schedule having a constant intra-delivery interval, and wherein the audio processing circuit is configured to adjust the timing of the outputting of the decoded audio based further on the network-related delivery delay.

17. The communication device of claim 16, wherein the network-related delivery delay comprises a delay resulting from systematic variances in radio access network timing, or a delay resulting from one or more retransmissions of audio data, or both.

18. The communication device of claim 16, wherein the first event report comprises a delay parameter indicating the sum of the network-related delivery delay and network communication circuit processing time.

19. The communication device of claim 16, wherein the network communication processing circuit is further configured to receive and demodulate a second communication frame to produce a second received encoded audio frame and to generate a second event report indicating a duration spent processing the second received encoded audio frame in the network communication processing circuit, and wherein the audio processing circuit is configured to adjust the timing of the outputting of the decoded audio by determining, based on the first and second generated event reports, that a timing drift has occurred, and adjusting the outputting of the decoded audio based on the timing drift.

20. The communication device of claim 16, wherein the audio processing circuit is configured to adjust the timing of the outputting of the decoded audio by calculating a start time for outputting the first frame of the decoded audio based on a frame duration, a maximum delay parameter, and the delay parameter corresponding to one or more of the received encoded audio frames.

* * * * *